(12) United States Patent
Nasevicius

(10) Patent No.: US 12,458,003 B2
(45) Date of Patent: Nov. 4, 2025

(54) TRANSGENIC ANGELFISH

(71) Applicant: GloFish, LLC, Earth City, MO (US)

(72) Inventor: Aidas Nasevicius, Tampa, FL (US)

( * ) Notice: Subject to any disclaimer, the term of this patent is extended or adjusted under 35 U.S.C. 154(b) by 0 days.

(21) Appl. No.: 18/902,255

(22) Filed: Sep. 30, 2024

(65) Prior Publication Data

US 2025/0143273 A1    May 8, 2025

Related U.S. Application Data

(60) Provisional application No. 63/595,484, filed on Nov. 2, 2023, provisional application No. 63/595,494, filed on Nov. 2, 2023, provisional application No. 63/595,505, filed on Nov. 2, 2023.

(51) Int. Cl.
*A01K 67/027*    (2024.01)
*A01K 67/0278*    (2024.01)

(52) U.S. Cl.
CPC .... *A01K 67/0278* (2013.01); *A01K 2217/052* (2013.01); *A01K 2227/40* (2013.01)

(58) Field of Classification Search
None
See application file for complete search history.

(56) References Cited

U.S. PATENT DOCUMENTS

| | | | |
|---|---|---|---|
| 7,135,613 | B1 | 11/2006 | Gong et al. |
| 7,700,825 | B2 | 4/2010 | Blake et al. |
| 7,834,239 | B2 | 11/2010 | Gong et al. |
| 9,295,237 | B2 | 3/2016 | Blake et al. |
| 2005/0198701 | A1 | 9/2005 | Lian et al. |
| 2007/0074301 | A1* | 3/2007 | Tsai .......... C07K 14/4716 800/20 |
| 2018/0064075 | A1* | 3/2018 | Blake .......... A01K 67/027 |
| 2019/0110449 | A1 | 4/2019 | Blake et al. |

OTHER PUBLICATIONS

Li-Hua and Chung Taipei Times, pp. 1-4 (Year: 2012).*
Nguyen et al DOI: https://doi.org/10.21203/rs.3.rs-1187734/v1, preprint, 1-18 (Year: 2022).*
Nguyen et al Journal of Fisheries and Environment, 46 (3) , 72-83 (Year: 2012).*
Chou, 2001, Uniform GFP-expression in transgenic medaka (*Oryzias latipes*) at the FO generation, Transgenic Research, 10(4):303-315.
Hsiao, 2001, Enhanced expression and stable transmission of transgenes flanked by inverted terminal repeats from adeno-associated virus in zebrafish, Developmental Dynamics, 220:323-336.
Li-Hua and Chung Taipei Times, 2012, pp. 1-4.
Nguyen, 2022, Red Fluorescent Proten Expression in Transgenic Founder of Angelfish (Pterophyllum sp) Driven by Zebrafish Myosin Light Chain 2 Promoter, Research Square, DOI: https://doi.org/10.21203/rs.3.rs-1187734/v1, 18 pages.
International Search Report and Written Opinion issued in International Application No. PCT/US2024/049278, date of mailing: Jan. 27, 2025, 16 pages.
Moutinho, 2022, Transgenic glowing fish invades Brazilian streams, Science, 375(6582):704-705.

* cited by examiner

*Primary Examiner* — Anoop K Singh
(74) *Attorney, Agent, or Firm* — BROWN RUDNICK LLP; Ryan C. Smith

(57) ABSTRACT

The present disclosure relates to transgenic ornamental Angelfish, as well as methods of making such fish by germ cell transplantation techniques. Also disclosed are methods of establishing a population of such transgenic Angelfish and methods of providing them to the ornamental fish industry for the purpose of marketing.

10 Claims, No Drawings

TRANSGENIC ANGELFISH

CROSS REFERENCE TO RELATED APPLICATIONS

This application is being filed on 30 Sep. 2024, as a U.S. Non-provisional patent application, and claims priority to U.S. Provisional Patent Application No. 63/595,484, filed on Nov. 2, 2023 and entitled Transgenic Red Angelfish, U.S. Provisional Patent Application No. 63/595,494, filed on Nov. 2, 2023 and entitled Transgenic Purple Angelfish, and U.S. Provisional Patent Application No. 63/595,505, filed on Nov. 2, 2023 and entitled Transgenic Green Angelfish. Each of the aforementioned references is incorporated herein by reference in its entirety.

FIELD OF THE INVENTION

This invention relates to transgenic fish, particularly Transgenic Angelfish.

INTRODUCTION

Transgenic technology involves the transfer of a foreign gene into a host organism enabling the host to acquire a new and inheritable trait. Transgenic technology has many potential applications. For example, it can be used to introduce a transgene into a fish in order to create new varieties of fish. There are many ways of introducing a foreign gene into fish, including: microinjection (e.g., Zhu et al., 1985; Du et al., 1992), electroporation (Powers et al., 1992), sperm-mediated gene transfer (Khoo et al., 1992; Sin et al., 1993), gene bombardment or gene gun (Zelenin et al., 1991), liposome-mediated gene transfer (Sezelei et al., 1994), and the direct injection of DNA into muscle tissue (Xu et al., 1999).

The first transgenic fish report was published by Zhu et al., (1985) using a chimeric gene construct consisting of a mouse metallothionein gene promoter and a human growth hormone gene. Most of the early transgenic fish studies have concentrated on growth hormone gene transfer with an aim of generating fast growing fish. While a majority of early attempts used heterologous growth hormone genes and promoters and failed to produce these fish (e.g. Chourrout et al., 1986; Penman et al., 1990; Brem et al., 1988; Gross et al., 1992), enhanced growth of transgenic fish has been demonstrated in several fish species including Atlantic salmon, several species of Pacific salmons, and loach (e.g. Du et al., 1992; Delvin et al., 1994, 1995; Tsai et al., 1995).

The freshwater angelfish (*P. scalare*) was described in 1824 by F. Schultze. In 1906, J. Pellegrin described *P. altum*. In 1963, *P. leopoldi* was described by J. P. Gosse. *P. scalare's* body does not show the stripe between the eye stripe and first complete body stripe at all, and the third stripe between the two main body stripes rarely extends downward more than a half inch, if even present. *P. leopoldi* fry develop three to eight body stripes, with all but one to five fading away as they mature, whereas *P. scalare* only has two in true wild form throughout life.

Angelfish were bred in captivity for at least 30 years prior to *P. leopoldi* being
described. Angelfish are one of the most commonly kept freshwater aquarium fish, as well as the most commonly kept cichlid. They are praised for their unique shape, color, and behavior. It was not until the late 1920s to early 1930s that the angelfish was bred in captivity in the United States. The most commonly kept species in the aquarium is *Pterophyllum scalare*. Most of the individuals in the aquarium trade are captive-bred. Sometimes, captive-bred *Pterophyllum altum* is available. *Pterophyllum leopoldi* is the hardest to find in the trade. Angelfish are kept in a warm aquarium, ideally around 80° F. (27° C.), with soft and acidic (<6.5 ph) water. Angelfish pairs form long-term relationships where each individual will protect the other from threats and potential suitors. Upon the death or removal of one of the mated pair, breeders have experienced the total refusal of the remaining mate to pair up with any other angelfish and successfully breed with subsequent mates.

Depending upon aquarium conditions, *P. scalare* reaches sexual maturity at the age of six to 12 months or more. In situations where the eggs are removed from the aquarium immediately after spawning, the pair is capable of spawning every seven to 10 days. Around the age of three years, spawning frequency decreases and eventually ceases.

When the pair is ready to spawn, they choose an appropriate medium upon which to lay the eggs, and spend one or two days picking off detritus and algae from the surface. This medium may be a broad-leaf plant in the aquarium, a flat surface such as a piece of slate placed vertically in the aquarium, a length of pipe, or even the glass sides of the aquarium. The female deposits a line of eggs on the spawning substrate, followed by the male, which fertilizes the eggs. This process is repeated until a total of 100 to more than 1,200 eggs are laid, depending on the size and health of the female fish. As both parents care for the offspring throughout development, the pair takes turns maintaining a high rate of water circulation around the eggs by swimming very close to the eggs and fanning them with their pectoral fins. In a few days, the eggs hatch and the fry remain attached to the spawning substrate. During this period, the fry survive by consuming the remnants of their yolk sacs. At one week, the fry detach and become free-swimming. Successful parents keep close watch on the eggs until then. At the free-swimming stage, the fry can be fed suitably sized live food.

*P. altum* is notably difficult to breed in an aquarium environment. Freshwater Angelfish with quality genetics are known to live approximately 12 years in captivity, if the ideal living conditions are provided. In the wild they are thought to live as long as 15 years if unthreatened by their numerous natural predators. In pet stores, the freshwater angelfish is typically placed in the semi-aggressive category. Some tetras and barbs are compatible with angelfish, but ones small enough to fit in the mouth of the angelfish may be eaten. Generous portions of food should be available so the angelfish do not get hungry and turn on their tank mates.

Most strains of angelfish available in the fishkeeping hobby are the result of many decades of selective breeding. For the most part, the original crosses of wild angelfish were not recorded and confusion between the various species of *Pterophyllum*, especially *P. scalare* and *P. leopoldi*, is common. This makes the origins of "domestic angelfish" unclear. Domestic strains are most likely a collection of genes resulting from more than one species of wild angelfish, combined with the selection of mutations in domesticated lines over the last 60 or more years. The result of this is a domestic angelfish that is a true hybrid, with little more than a superficial resemblance to wild *Pterophyllum* species. The various strains of angelfish include: Silver (+/+), Gold (g/g), Zebra (Z/+ or Z/Z), Black lace (D/+) or zebra lace (D/+-Z/+), Smokey (Sm/+); Chocolate (Sm/Sm); Halfblack (h/h); Sunset blushing (g/g S/S); Koi (Gm/Gm S/S) or (Gm/g S/S); Leopard (Sm/Sm Z/Z) or (Sm/Sm Z/+); Blue blushing (S/S); Silver gold marble (Gm/+); Ghost (S/+); Gold marble (Gm/g or Gm/Gm); Marble (M/+ or M/M or M/g or M/Gm); Black hybrid (D/g or D/Gm); Pearlscale (p/p); Black ghost (D/+-S/+); and Albino (a/a).

The silver angelfish most commonly resembles the wild form of angelfish, and is also referred to as "wild-type". It is not, however, caught in the wild and is considered domestic. The fish has a silver body with red eyes, and three vertical black stripes that can fade or darken depending on the mood of the fish.

Gold (g/g): The genetic trait for the gold angelfish is recessive, and causes a light golden body with a darker yellow or orange color on the crown of the fish. It does not have the vertical black stripes or the red eye seen in the wild angelfish.

Zebra (Z/+ or Z/Z): The zebra phenotype results in four to six vertical stripes on the fish that in other ways resembles a silver angelfish. It is a dominant mutation that exists at the same locus as the stripeless gene.

Black lace (D/+) or zebra lace (D/+-Z/+): A silver or zebra with one copy of the dark gene results in very attractive lacing in the fins, considered by some to the most attractive of all angelfish varieties.

Smokey (Sm/+): A variety with a dark brownish grey back half and dark dorsal and anal fins.

Chocolate (Sm/Sm): Homozygous for Smokey with more of the dark pattern, sometimes only the head is silver.

Halfblack (h/h): Silver with a black rear portion, Halfblack can express along with some other color genes, but not all. The pattern may not develop or express if the fish are in stressful conditions.

Sunset blushing (g/g S/S): The sunset blushing has two genes of gold and two genes of stripeless. The upper half of the fish exhibits orange on the best specimens. The body is mostly white in color, and the fins are clear. The amount of orange showing on the fish can vary. On some, the body is a pinkish or tangerine color. The term blushing comes from the clear gill plates found on juveniles, with pinkish gills underneath.

Koi (Gm/Gm S/S) or (Gm/g S/S): The koi has a double or single gene of gold marble with a double gene of stripeless. Their expression of orange varies with stress levels. The black marbling varies from 5%- 40% coverage.

Leopard (Sm/Sm Z/Z) or (Sm/Sm Z/+): Leopards are very popular fish when young, having spots over most of their bodies. Most of these spots grow closer together as adults, so they look like chocolates with dots.

Blue blushing (S/S): This wild-type angelfish has two stripeless genes. The body is actually grey with a bluish tint under the right light spectrum. An iridescent pigment develops as they age. This iridescence usually appears blue under most lighting.

Silver gold marble (Gm/+): A silver angel with a single gold marble gene, this is a co-dominant expression.

Ghost (S/+): Heterozygous for stripeless results in a mostly silver fish with just a stripe through the eye and tail. Sometimes, portions of the body stripes will express.

Gold marble (Gm/g or Gm/Gm): Depending on whether the Gold Marble is single or double dose, the marbling will range from 5% to 40% coverage.

Marble (M/+ or M/M or M/g or M/Gm): Marble expresses with much more black pattern than gold marble. The marbling varies from 50% to 95%.

Black hybrid (D/g or D/Gm): A cross of black with a gold, the result is black hybrids, a very vigorous black that may look brassy when young. This cross does not breed true.

Pearlscale (p/p): Pearlscale is a scale mutation, also called the "diamond" angelfish in some regions due to the gem-like iridescence on its scales. The scales have a wrinkled, wavy look that reflects light to create a sparkling effect. Pearl develops slowly, starting at around 9 weeks of age. In can be inhibited by stressful conditions. It is recessive, requiring both parents to contribute the allele.

Black ghost (D/+-S/+): Similar to a ghost, it has a darker appearance due to the dark gene, and very similar to a black lace without complete stripes. Ghosts generally have more iridescence than normal.

Albino (a/a): Albino removes dark pigments in most varieties. Some, like albino marble still have a little black remaining on a percentage of the fish. The eye pupils are pink as in all albino animals. The surrounding iris can be red or yellow depending on the variety.

The genus is well known among aquarists for its many species. They are well suited to tropical freshwater community aquariums, as they get along well with other species and are not at all aggressive. However, for the ornamental fish industry, the bronze, albino or black body does not aid in the efficient display of the various colors. The availability of such Angelfish having modified pigmentation for transgenesis with fluorescent proteins would result in better products for the ornamental fish industry due to better visualization of the various colors.

Many fluorescent proteins are known in the art and have been used to investigate various cellular processes, including fluorescent proteins exhibiting various green, purple and red colors. Although transgenic experiments involving fluorescent proteins have provided new markers and reporters for transgenesis, progress in the field of developing and producing Angelfish that express such proteins has been limited and brings several technical challenges.

TRANSGENIC ANGELFISH

In certain embodiments, the present disclosure concerns making transgenic fluorescent fish and providing such fish to the ornamental fish industry.

In some embodiments, transgenic fish or methods of making transgenic fish are provided. In certain aspects, the transgenic fish are fertile, transgenic, fluorescent fish. In a particular embodiment, the fish for use with the disclosed constructs and methods is the Angelfish. Angelfish skin color is determined by pigment cells in the skin, which contain pigment granules called melanosomes (black or brown color), xanthosomes (yellow color), erythrosomes (orange or red color), or iridosomes (iridescent colors, including white color). The number, size, and density of the pigment granules per pigment cell influence the color of the fish skin.

In certain specific embodiments, there are provided transgenic Angelfish or progeny thereof comprising specific transgenic integration events, referred to herein as transformation events. These fish are of particular interest because, for example, they embody an aesthetically pleasing Red color. Transgenic fish comprising these specific transgenic events may be homozygous or heterozygous (including, for example, hemizygous) for the transformation event. Homozygous fish bred with fish lacking a transformation event will in nearly all cases produce 100% heterozygous offspring. Germ cells, eggs, sperm, and embryos comprising these specific transgenic events are also included as part of the described invention herein.

In one such embodiment regarding a specific transgenic integration event, a red transgenic Angelfish or progeny thereof is provided comprising chromosomally integrated transgenes, wherein the Angelfish comprises the "Red Angelfish 1 transformation event," cryopreserved adult germ stem cells comprising the Red Angelfish 1 transformation event having been deposited as ATCC accession no. PTA-127785. The chromosomally integrated transgenes may be present on one copy of the integrated expression cassette or two or more copies of the integrated expression cassettes. In certain aspects, such a transgenic Angelfish is a fertile, transgenic Angelfish. Such a transgenic Angelfish may be homozygous or heterozygous (including, for example, hemizygous) for the transgenes or integrated expression cassette(s).

Also disclosed are methods of providing a transgenic Angelfish comprising the Red Angelfish 1 transformation event to the ornamental fish market. In some embodiments, the method comprises obtaining a transgenic Angelfish or progeny thereof comprising chromosomally integrated transgenes, wherein the Angelfish comprises the "Red Angelfish 1 transformation event," cryopreserved adult germ stem cells comprising the Red Angelfish 1 transformation event having been deposited as ATCC accession no. PTA-127785, and distributing the fish to the ornamental fish market. Such fish may be distributed by a grower to a commercial distributor, or such fish may be distributed by a grower or a commercial distributor to a retailer such as, for example, a multi-product retailer having an ornamental fish department.

In some aspects, methods of producing a transgenic Angelfish are provided comprising: (a) obtaining an Angelfish that exhibits fluorescence and comprises one or more chromosomally integrated transgenes or expression cassettes, wherein the Angelfish comprises the "Red Angelfish 1 transformation event," cryopreserved adult germ stem cells comprising the Red Angelfish 1 transformation event having been deposited as ATCC accession no. PTA-127785; and (b) breeding the obtained Angelfish with a second Angelfish to provide a transgenic Angelfish comprising the Red Angelfish 1 transformation event. The second Angelfish may be a transgenic or non-transgenic Angelfish.

In further embodiments, also provided are methods of producing a transgenic organism, the method comprising using germ cell transplantation to produce the Red Angelfish 1 transformation, such cryopreserved adult germ stem cells having been deposited as ATCC accession no. PTA-127785, to produce transgenic offspring. Such offspring may be, for example, an Angelfish, a species of the *Cichlid* family, a fish species or genus related to Angelfish, or another fish species or genus.

In other certain specific embodiments, there are provided transgenic Angelfish or progeny thereof comprising specific transgenic integration events, referred to herein as transformation events. These fish are of particular interest because, for example, they embody an aesthetically pleasing Green color. Transgenic fish comprising these specific transgenic events may be homozygous or heterozygous (including, for example, hemizygous) for the transformation event. Homozygous fish bred with fish lacking a transformation event will in nearly all cases produce 100% heterozygous offspring. Germ cells, eggs, sperm, and embryos comprising these specific transgenic events are also included as part of the described invention herein.

In another embodiment regarding a specific transgenic integration event, a green transgenic Angelfish or progeny thereof is provided comprising chromosomally integrated transgenes, wherein the Angelfish comprises the "Green Angelfish 1 transformation event," cryopreserved adult germ stem cells comprising the Green Angelfish 1 transformation event having been deposited as ATCC accession no. PTA-127787. The chromosomally integrated transgenes may be present on one integrated expression cassette or two or more integrated expression cassettes. In certain aspects, such a transgenic Angelfish is a fertile, transgenic Angelfish. Such a transgenic Angelfish may be homozygous or heterozygous (including, for example, hemizygous) for the transgenes or integrated expression cassette(s).

Also disclosed are methods of providing a transgenic Angelfish comprising the Green Angelfish 1 transformation event to the ornamental fish market. In some embodiments, the method comprises obtaining a transgenic Angelfish or progeny thereof comprising chromosomally integrated transgenes, wherein the Angelfish comprises the "Green Angelfish 1 transformation event," cryopreserved adult germ stem cells comprising the Green Angelfish 1 transformation event having been deposited as ATCC accession no. PTA-127787, and distributing the fish to the ornamental fish market. Such fish may be distributed by a grower to a commercial distributor, or such fish may be distributed by a grower or a commercial distributor to a retailer such as, for example, a multi-product retailer having an ornamental fish department.

In some aspects, methods of producing a transgenic Angelfish are provided comprising: (a) obtaining an Angelfish that exhibits fluorescence and comprises one or more chromosomally integrated transgenes or expression cassettes, wherein the Angelfish comprises the "Green Angelfish 1 transformation event," cryopreserved adult germ stem cells comprising the Green Angelfish 1 transformation event having been deposited as ATCC accession no. PTA-127787; and (b) breeding the obtained Angelfish with a second Angelfish to provide a transgenic Angelfish comprising the Green Angelfish 1 transformation event. The second Angelfish may be a transgenic or non-transgenic Angelfish.

In further embodiments, also provided are methods of producing a transgenic organism, the method comprising using germ cell transplantation to produce the Green Angelfish 1 transformation, such cryopreserved adult germ stem cells having been deposited as ATCC accession no. PTA-127787, to produce transgenic offspring. Such offspring may be, for example, an Angelfish, a species of the *Cichlid* family, a fish species or genus related to Angelfish, or another fish species or genus.

In other certain specific embodiments, there are provided transgenic Angelfish or progeny thereof comprising specific transgenic integration events, referred to herein as transformation events. These fish are of particular interest because, for example, they embody an aesthetically pleasing Purple color. Transgenic fish comprising these specific transgenic events may be homozygous or heterozygous (including, for example, hemizygous) for the transformation event. Homozygous fish bred with fish lacking a transformation event will in nearly all cases produce 100% heterozygous offspring. Germ cells, eggs, sperm, and embryos comprising these specific transgenic events are also included as part of the described invention herein.

In another embodiment regarding a specific transgenic integration event, a purple transgenic Angelfish or progeny thereof is provided comprising chromosomally integrated transgenes, wherein the Angelfish comprises the "Purple Angelfish 1 transformation event," cryopreserved adult germ stem cells comprising the Purple Angelfish 1 transformation event having been deposited as ATCC accession no. PTA-127786. The chromosomally integrated transgenes may be present on one integrated expression cassette or two or more integrated expression cassettes. In certain aspects, such a transgenic Angelfish is a fertile, transgenic Angelfish. Such a transgenic Angelfish may be homozygous or heterozygous (including, for example, hemizygous) for the transgenes or integrated expression cassette(s).

Also disclosed are methods of providing a transgenic Angelfish comprising the Purple Angelfish 1 transformation event to the ornamental fish market. In some embodiments, the method comprises obtaining a transgenic Angelfish or progeny thereof comprising chromosomally integrated transgenes, wherein the Angelfish comprises the "Purple Angelfish 1 transformation event," cryopreserved adult germ stem cells comprising the Purple Angelfish 1 transformation event having been deposited as ATCC accession no. PTA-127786, and distributing the fish to the ornamental fish market. Such fish may be distributed by a grower to a commercial distributor, or such fish may be distributed by a grower or a commercial distributor to a retailer such as, for example, a multi-product retailer having an ornamental fish department.

In some aspects, methods of producing a transgenic Angelfish are provided comprising: (a) obtaining an Angelfish that exhibits fluorescence and comprises one or more chromosomally integrated transgenes or expression cassettes, wherein the Angelfish comprises the "Purple Angelfish 1 transformation event," cryopreserved adult germ stem cells comprising the Purple Angelfish 1 transformation event having been deposited as ATCC accession no. PTA-127786; and (b) breeding the obtained Angelfish with a second Angelfish to provide a transgenic Angelfish comprising the Purple Angelfish 1 transformation event. The second Angelfish may be a transgenic or non-transgenic Angelfish.

In further embodiments, also provided are methods of producing a transgenic organism, the method comprising using germ cell transplantation to produce the Purple Angelfish 1 transformation, such cryopreserved adult germ stem cells having been deposited as ATCC accession no. PTA-127786, to produce transgenic offspring. Such offspring may be, for example, an Angelfish, a species of the *Cichlid* family, a fish species or genus related to Angelfish, or another fish species or genus.

As used in this specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the device, the method being employed to determine the value, or the variation that exists among the study subjects.

Any embodiment of any of the present methods, kits, and compositions may consist of or consist essentially of— rather than comprise/include/contain/have—the described features and/or steps. Thus, in any of the claims, the term "consisting of" or "consisting essentially of" may be substituted for any of the open-ended linking verbs recited above, in order to change the scope of a given claim from what it would otherwise be using the open-ended linking verb.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION

Transgenic Fish

In some aspects, the present disclosure regards transgenic fish. Methods of making transgenic fish are described in, for example, U.S. Pat. Nos. 7,135,613; 7,700,825; 7,834,239, each of which is incorporated by reference in its entirety.

For example, a transgenic red Angelfish may be generated using an expression cassette encoding Red fluorescent protein (RFP), such as TurboRFP, DsRed2, tdTomato, dTomato, eqFP578, DsRed-Express, DsRed-Express2, TagRFP, TagRFP-T, RRvT, cgffagRFP, mApple, mRuby3, mNectarine, meffRFP, mScarlet-1, and amilFP593.

In other examples, a transgenic green Angelfish may be generated using an expression cassette encoding Green fluorescent protein (GFP), such as zsGreen1, eYGFPdp, AausFP1, mNeonGreen, maxNeonGreen, mGreenLantern, Clover, mClover3, PlamGFP, aeurGFP, afraGFP, WasCFP, NowGFP, cerFP505, pporGFP, Kohinoor, efasGFP, eechGFP1, bfloGFPa1, LanFP1 and LanFP2.

In other examples, a transgenic purple Angelfish may be generated using an expression cassette encoding Purple fluorescent protein (PFP), purple fluorescent protein (PFP), such as FP635. Alternative purple fluorescent proteins include, but are not limited to Katushka2S, mKate2, mCherry2, mCherry, mKate-S158C, eqFP650, mPlum, jRed, and mRFP1.

It is preferred that fish belonging to species and varieties of fish of commercial value, particularly commercial value within the ornamental fish industry, be used. Such fish include but are not limited to catfish, zebrafish and other danios, medaka, carp, tilapia, goldfish, tetras, barbs, sharks (family cyprinidae, such as rainbow shark), angelfish, loach, koi, glassfish, discus, eel, goby, gourami, guppy, Xiphophorus, hatchet fish, Molly fish, or pangasius. A particular fish for use in the context of the present disclosure is an Angelfish. Angelfish are increasingly popular ornamental animals and would be of added commercial value in various colors. Angelfish embryos are easily accessible. Angelfish skin color is determined by pigment cells in the skin, which contain pigment granules called melanosomes. The number, size, and density of the melanosomes per pigment cell influence the color of the fish skin.

In commercial aquaculture, Angelfish are spawned naturally. In one example embodiment a group of females and males are placed in a vat where PVC tiles are hung from vat sides as spawning media. The tiles with deposited eggs are collected, transferred into aquaria and incubated at 74-82 degrees Fahrenheit until the fry hatch (i.e. about 2 to 4 days). At this time the tiles are removed. The fry are fed freshly hatched Artemia nauplii for approximately 2 weeks. At this time the fry can be safely handled and can be transferred into grow-out vats or outside earthen ponds. It takes about six to twelve months for Angelfish to mature. In a related embodiment, line propagation is maintained by cryopreserved adult male germ cells.

Germ Cell Transplantation

Fish gonad freezing methods are well-known in the art; see, e.g., Lee et al. (2013), and Seki et al. (2017), both of which are incorporated herein by reference in their entireties. To obtain the transgenic fish disclosed herein, germ cells obtained from dissociated frozen Angelfish gonads may be used.

In an example embodiment, mature male Angelfish are euthanized using an overdose of sedative, such as Tricaine, followed by brain destruction using scissors. The fish are blotted dry, dissected and their testes are removed and transferred into ice-cold L-15 medium. When the desired amount of tissue is obtained, the testes are macerated using scissors into approximately 1-2 mm fragments. The tissue fragments are allowed to settle, the L-15 medium is removed, and L-15 medium with 2 mg/ml Collagenase I, 10% Fetal Bovine Serum (FBS), and 2 U/ml of DNaseI is added to the tissue—1 ml of the solution for tissue collected from 4-5 fish. The tissue is incubated on a rocker at room temperature for 1 hour, triturating every 15 minutes (5 times each time, using wide bore pipette tip). After the incubation, the obtained cell suspension with remaining tissue fragments is filtered through 40-micron sieve. The retained tissue is rinsed with L-15 medium, filtered and combined with the previously obtained filtrate. The suspension is centrifuged in a swinging rotor for 5 minutes at 1000 RPM at 10 degrees C. The supernatant is removed and discarded, the pellet is suspended in cold L-15 medium with 5% Percoll. The suspension is overlayed on top of 20% Percoll made with L-15 medium and is centrifuged in a swinging rotor for 20 minutes at 1500 RPM at 10 degrees C. The interphase is collected and double volume of L-15 medium is added. The suspension is centrifuged in a swinging rotor for 5 minutes at 1000 RPM at 10 degrees C. The supernatant is removed and discarded, the pellet is suspended in cold Opti-MEM medium. The suspension is kept on ice. To freeze the cells, transfer 100 µL of ice cold 1.4M DMSO in 1×HBSS to cryovial. Add 33 µL of the cell suspension, mix, and transfer the cryovial into iCellBox or a comparable cell freezing container for freezing rate of 1 degrees C. per minute. When the iCellBox is full, it is transferred into a cooler with dry ice and is left to freeze overnight or at least for 12 hours. After the freezing, the cryovials are transferred from iCellBox into liquid nitrogen for long-term storage.

In one example method of recovering a red Angelfish line, where the cryopreserved cells are thawed by transferring a cryovial from liquid nitrogen into 10-15 degree C. water bath and incubating until the cell suspension thaws—approximately for 1 minute. 1 ml of ice cold Opti-MEM medium is added to the suspension, mixed, and centrifuged in a swinging rotor for 5 minutes at 1000 RPM at 10 degrees C. The supernatant except for 50 µL is removed and discarded, and 0.5 ml of Opti-MEM medium is added to the pellet. The pellet is suspended and the suspension is incubated at 30 degrees C. for 30 minutes. After the incubation, the suspension is centrifuged in a swinging rotor for 5 minutes at 1000 RPM at 10 degrees C. The supernatant except for —5-10 µL is removed and discarded and the cells are resuspended in the remaining supernatant. The cell suspension is then injected into 9 day old anesthetized with Tricaine Angelfish fry which were treated with primordazine B—approximately 50 nl of the suspension per fry. The injected fry are reared to adulthood and spawned using regular protocol to obtain red Angelfish progeny. To treat Angelfish embryos with primordazine B, approximately 200-300 less than one-hour old Angelfish eggs are removed from the tiles and transferred into a Petri dish with 40 ml of water suitable for fish. Primordazine B solution in DMSO is added to the final concentration of 5.5 µg/ml and mixed. The eggs are incubated in the solution for 24 hours at 28-30 degrees C. and then are transferred into a tank for hatching.

The present disclosure further encompasses progeny of a transgenic fish containing the Red Angelfish 1 transformation event, as well as such transgenic fish derived from a transgenic fish egg, sperm cell, embryo, or other cell containing a genomically integrated transgenic construct. "Progeny," as the term is used herein, can result from breeding two transgenic fish of the invention, or from breeding a first transgenic fish of the invention to a second fish that is not a transgenic fish of the invention. In the latter case, the second fish can, for example, be a wild-type fish, a specialized strain of fish, a mutant fish, or another transgenic fish. The second fish may be of the same species, or may be of a different species or genus. The hybrid progeny of these matings have the benefits of the transgene for fluorescence combined with the benefits derived from these other lineages.

The simplest way to identify fish containing the Red Angelfish 1 transformation event is by visual inspection, as the fish in question would be red colored and immediately distinguishable from non-transgenic fish. It should be appreciated that depending on the specific RFP used and/or the insertion location of the expression cassette, the transgenic red Angelfish may have a color that is maintained over the course of the life of the transgenic red Angelfish's life and/or throughout multiple generations. It should also be appreciated that depending on the specific RFP used and/or the insertion location of the expression cassette, the transgenic red Angelfish may have a color that fades over the course of the transgenic red Angelfish's life. For example, the red transgenic Angelfish may change in color from red to pale red, or from red to pink. In addition, depending on the specific RFP used and/or the insertion location of the expression cassette, the transgenic red Angelfish may have a color that fades over generations. For example, the red transgenic Angelfish may change in color from one generation to the next, such that an older generation may exhibit the red color, but a younger generation may appear pale red, or pink.

The present disclosure further encompasses progeny of a transgenic fish containing the Green Angelfish 1 transformation event, as well as such transgenic fish derived from a transgenic fish egg, sperm cell, embryo, or other cell containing a genomically integrated transgenic construct. "Progeny," as the term is used herein, can result from breeding two transgenic fish of the invention, or from breeding a first transgenic fish of the invention to a second fish that is not a transgenic fish of the invention. In the latter case, the second fish can, for example, be a wild-type fish, a specialized strain of fish, a mutant fish, or another transgenic fish. The second fish may be of the same species, or may be of a different species or genus. The hybrid progeny of these matings have the benefits of the transgene for fluorescence combined with the benefits derived from these other lineages.

The simplest way to identify fish containing the Green Angelfish 1 transformation event is by visual inspection, as the fish in question would be green colored and immediately distinguishable from non-transgenic fish.

The present disclosure further encompasses progeny of a transgenic fish containing the Purple Angelfish 1 transformation event, as well as such transgenic fish derived from a transgenic fish egg, sperm cell, embryo, or other cell containing a genomically integrated transgenic construct. "Progeny," as the term is used herein, can result from breeding two transgenic fish of the invention, or from breeding a first transgenic fish of the invention to a second fish that is not a transgenic fish of the invention. In the latter case, the second fish can, for example, be a wild-type fish, a specialized strain of fish, a mutant fish, or another transgenic fish. The second fish may be of the same species, or may be of a different species or genus. The hybrid progeny of these matings have the benefits of the transgene for fluorescence combined with the benefits derived from these other lineages.

The simplest way to identify fish containing the Purple Angelfish 1 transformation event is by visual inspection, as the fish in question would be purple colored and immediately distinguishable from non-transgenic fish.

EXAMPLES

Certain embodiments of the invention are further described with reference to the following examples. These examples are intended to be merely illustrative of the invention and are not intended to limit or restrict the scope of the present invention in any way and should not be construed as providing conditions, parameters, reagents, or starting materials that must be utilized exclusively in order to practice the art of the present invention.

Example 1—Red Transgenic Angelfish

Transgenic fish exhibiting a Red color are provided. The specific transgenic events embodied in these fish are designated the "Red Angelfish 1 transformation event". Germ cells from these fish may be implanted into Angelfish eggs and thereby obtain transgenic Angelfish that comprises the specific transgenic integration events. Cryopreserved adult germ stem cells from this line was deposited at the ATCC, Historic District, 10801 University Blvd, Manassas, VA 20110, under the provisions of the Budapest Treaty as "Red Angelfish 1" (the deposit was designated as accession no. PTA-127785).

The fluorescent transgenic fish have use as ornamental fish in the market. Stably expressing transgenic lines can be developed by breeding a transgenic individual with a wild-type fish, mutant fish, or another transgenic fish. The desired transgenic fish can be distinguished from non-transgenic fish by observing the fish in white light, sunlight, ultraviolet light, blue light, or any other useful lighting condition that allows visualization of the Red color of the transgenic fish.

Example 2—Green Transgenic Angelfish

Transgenic fish exhibiting a Green color are provided. The specific transgenic events embodied in these fish are designated the "Green Angelfish 1 transformation event". Germ cells from these fish may be implanted into Angelfish eggs and thereby obtain transgenic Angelfish that comprises the specific transgenic integration events. Cryopreserved adult germ stem cells from this line was deposited at the ATCC, Historic District, 10801 University Blvd, Manassas, VA 20110, under the provisions of the Budapest Treaty as "Green Angelfish I" (the deposit was designated as accession no. PTA-127787).

The fluorescent transgenic fish have use as ornamental fish in the market. Stably expressing transgenic lines can be developed by breeding a transgenic individual with a wild-type fish, mutant fish, or another transgenic fish. The desired transgenic fish can be distinguished from non-transgenic fish by observing the fish in white light, sunlight, ultraviolet light, blue light, or any other useful lighting condition that allows visualization of the Green color of the transgenic fish.

Example 3—Purple Transgenic Angelfish

Transgenic fish exhibiting a Purple color are provided. The specific transgenic events embodied in these fish are designated the "Purple Angelfish 1 transformation event". Germ cells from these fish may be implanted into Angelfish eggs and thereby obtain transgenic Angelfish that comprises the specific transgenic integration events. Cryopreserved adult germ stem cells from this line was deposited at the ATCC, Historic District, 10801 University Blvd, Manassas, VA 20110, under the provisions of the Budapest Treaty as "Purple Angelfish 1" (the deposit was designated as accession no. PTA-127786).

The fluorescent transgenic fish have use as ornamental fish in the market. Stably expressing transgenic lines can be developed by breeding a transgenic individual with a wild-type fish, mutant fish, or another transgenic fish. The desired transgenic fish can be distinguished from non-transgenic fish by observing the fish in white light, sunlight, ultraviolet light, blue light, or any other useful lighting condition that allows visualization of the Purple color of the transgenic fish.

The fluorescent transgenic fish should also be valuable in the market for scientific research tools because they can be used for embryonic studies such as tracing cell lineage and cell migration. Additionally, these fish can be used to mark cells in genetic mosaic experiments and in fish cancer models.

Aspects of the present disclosure are further described in the below clauses:

1. A transgenic Angelfish comprising a chromosomally integrated expression cassette encoding a fluorescent protein, wherein the Angelfish comprises the "Red Angelfish 1 transformation event."
2. The transgenic Angelfish of clause 1, further defined as a fertile, transgenic Angelfish cryopreserved adult germ stem cells comprising the Red Angelfish 1 transformation event having been deposited as ATCC accession no. PTA-127785.
3. The transgenic Angelfish of any one of clauses 1 or 2, wherein the fish is homozygous for the integrated expression cassette.
4. The transgenic Angelfish of any one of clauses 1 or 2, wherein the fish is heterozygous for the integrated expression cassette.
5. A method of providing a transgenic Angelfish to the ornamental fish market, comprising obtaining a transgenic Angelfish of any one of clauses 1 or 2, and distributing the fish to the ornamental fish market.
6. The method of clause 5, wherein the fish are distributed by a grower to a commercial distributor.
7. The method of clause 5, wherein the fish are distributed by a grower or a commercial distributor to a retailer.
8. The method of clause 7, wherein the retailer is a multi-product retailer having an ornamental fish department.
9. A method of producing a transgenic Angelfish comprising:
   (a) obtaining an Angelfish that comprises a chromosomally integrated expression cassette encoding a fluorescent protein, wherein the Angelfish comprises the "Red Angelfish 1 transformation event"; and
   (b) breeding the obtained Angelfish with a second Angelfish to provide a transgenic Angelfish comprising the Red Angelfish 1 transformation event.
10. The method of clause 9, wherein the second Angelfish is a non-transgenic Angelfish.
11. A progeny of a transgenic Angelfish of clause 1 that comprises a chromosomally integrated expression cassette encoding a fluorescent protein, wherein the Angelfish and progeny exhibit fluorescence and comprise the "Red Angelfish 1 transformation event," cryopreserved adult germ stem cells comprising the Red Angelfish 1 transformation event having been deposited as ATCC accession no. PTA-127785.

12. The progeny fish of clause 11, further defined as a fertile, transgenic Angelfish.

13. The progeny fish of clause 11, wherein the fish is homozygous for the integrated expression cassette.

14. The progeny fish of clause 11, wherein the fish is heterozygous for the integrated expression cassette.

15. A method of providing a transgenic fish to the ornamental fish market, comprising obtaining a progeny fish in accordance with clause 11, and distributing the fish to the ornamental fish market.

16. The method of clause 15, wherein the fish are distributed by a grower to a commercial distributor.

17. The method of clause 16, wherein the fish are distributed by a grower or a commercial distributor to a retailer.

18. The method of clause 17, wherein the retailer is a multi-product retailer having an ornamental fish department.

19. A method of producing a transgenic fish comprising:
    (a) obtaining a transgenic fish in accordance with clause 11; and
    (b) breeding the obtained fish with a second fish to provide a transgenic fish comprising the Red Angelfish 1 transformation event.

20. The method of clause 19, wherein the second fish is a non-transgenic fish.

21. A transgenic Angelfish comprising a chromosomally integrated expression cassette encoding a fluorescent protein, wherein the Angelfish comprises the "Green Angelfish 1 transformation event."

22. The transgenic Angelfish of clause 21, further defined as a fertile, transgenic Angelfish cryopreserved adult germ stem cells comprising the Green Angelfish 1 transformation event having been deposited as ATCC accession no. PTA-127787.

23. The transgenic Angelfish of any one of clauses 21 or 22, wherein the fish is homozygous for the integrated expression cassette.

24. The transgenic Angelfish of any one of clauses 21 or 22, wherein the fish is heterozygous for the integrated expression cassette.

25. A method of providing a transgenic Angelfish to the ornamental fish market, comprising obtaining a transgenic Angelfish of any one of clauses 21 or 22, and distributing the fish to the ornamental fish market.

26. The method of clause 25, wherein the fish are distributed by a grower to a commercial distributor.

27. The method of clause 25, wherein the fish are distributed by a grower or a commercial distributor to a retailer.

28. The method of clause 27, wherein the retailer is a multi-product retailer having an ornamental fish department.

29. A method of producing a transgenic Angelfish comprising:
    (a) obtaining an Angelfish that comprises a chromosomally integrated expression cassette encoding a fluorescent protein, wherein the Angelfish comprises the "Green Angelfish 1 transformation event"; and
    (b) breeding the obtained Angelfish with a second Angelfish to provide a transgenic Angelfish comprising the Green Angelfish 1 transformation event.

30. The method of clause 29, wherein the second Angelfish is a non-transgenic Angelfish.

31. A progeny of a transgenic Angelfish of clause 21 that comprises a chromosomally integrated expression cassette encoding a fluorescent protein, wherein the Angelfish and progeny exhibit fluorescence and comprise the "Green Angelfish 1 transformation event," cryopreserved adult germ stem cells comprising the Green Angelfish 1 transformation event having been deposited as ATCC accession no. PTA-127787.

32. The progeny fish of clause 31, further defined as a fertile, transgenic Angelfish.

33. The progeny fish of clause 31, wherein the fish is homozygous for the integrated expression cassette.

34. The progeny fish of clause 31, wherein the fish is heterozygous for the integrated expression cassette.

35. A method of providing a transgenic fish to the ornamental fish market, comprising obtaining a progeny fish in accordance with clause 31, and distributing the fish to the ornamental fish market.

36. The method of clause 35, wherein the fish are distributed by a grower to a commercial distributor.

37. The method of clause 36, wherein the fish are distributed by a grower or a commercial distributor to a retailer.

38. The method of clause 37, wherein the retailer is a multi-product retailer having an ornamental fish department.

39. A method of producing a transgenic fish comprising:
    (a) obtaining a transgenic fish in accordance with clause 31; and
    (b) breeding the obtained fish with a second fish to provide a transgenic fish comprising the Green Angelfish 1 transformation event.

40. The method of clause 39, wherein the second fish is a non-transgenic fish.

41. A transgenic Angelfish comprising a chromosomally integrated expression cassette encoding a fluorescent protein, wherein the Angelfish comprises the "Purple Angelfish 1 transformation event."

42. The transgenic Angelfish of clause 41, further defined as a fertile, transgenic Angelfish cryopreserved adult germ stem cells comprising the Purple Angelfish 1 transformation event having been deposited as ATCC accession no. PTA-127786.

43. The transgenic Angelfish of any one of clauses 41 or 42, wherein the fish is homozygous for the integrated expression cassette.

44. The transgenic Angelfish of any one of clauses 41 or 42, wherein the fish is heterozygous for the integrated expression cassette.

45. A method of providing a transgenic Angelfish to the ornamental fish market, comprising obtaining a transgenic Angelfish of any one of clauses 41 or 42, and distributing the fish to the ornamental fish market.

46. The method of clause 45, wherein the fish are distributed by a grower to a commercial distributor.

47. The method of clause 45, wherein the fish are distributed by a grower or a commercial distributor to a retailer.

48. The method of clause 47, wherein the retailer is a multi-product retailer having an ornamental fish department.

49. A method of producing a transgenic Angelfish comprising:
    (a) obtaining an Angelfish that comprises a chromosomally integrated expression cassette encoding a fluorescent protein, wherein the Angelfish comprises the "Purple Angelfish 1 transformation event"; and
(b) breeding the obtained Angelfish with a second Angelfish to provide a transgenic Angelfish comprising the Purple Angelfish 1 transformation event.

50. The method of clause 49, wherein the second Angelfish is a non-transgenic Angelfish.

51. A progeny of a transgenic Angelfish of clause 41 that comprises a chromosomally integrated expression cassette encoding a fluorescent protein, wherein the Angelfish and progeny exhibit fluorescence and comprise the "Purple Angelfish 1 transformation event," cryopreserved adult germ stem cells comprising the Purple Angelfish 1 transformation event having been deposited as ATCC accession no. PTA-127786.

52. The progeny fish of clause 51, further defined as a fertile, transgenic Angelfish.

53. The progeny fish of clause 51, wherein the fish is homozygous for the integrated expression cassette.

54. The progeny fish of clause 51, wherein the fish is heterozygous for the integrated expression cassette.

55. A method of providing a transgenic fish to the ornamental fish market, comprising obtaining a progeny fish in accordance with clause 51, and distributing the fish to the ornamental fish market.

56. The method of clause 55, wherein the fish are distributed by a grower to a commercial distributor.

57. The method of clause 56, wherein the fish are distributed by a grower or a commercial distributor to a retailer.

58. The method of clause 57, wherein the retailer is a multi-product retailer having an ornamental fish department.

59. A method of producing a transgenic fish comprising:
(a) obtaining a transgenic fish in accordance with clause 51; and
(b) breeding the obtained fish with a second fish to provide a transgenic fish comprising the Purple Angelfish 1 transformation event.

60. The method of clause 59, wherein the second fish is a non-transgenic fish.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope, and concept of the invention as defined by the appended claims.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A transgenic Angelfish whose genome comprises a chromosomally integrated expression cassette encoding a red fluorescent protein, wherein the transgenic Angelfish comprise the "Red Angelfish 1 transformation event", germ stem cells comprising the "Red Angelfish 1 transformation event" having been deposited as ATCC accession no. PTA-127785, wherein the transgenic Angelfish exhibits fluorescence.

2. The transgenic Angelfish of claim 1, further defined as a fertile transgenic Angelfish.

3. The transgenic Angelfish of claim 1, wherein the transgenic Angelfish is homozygous for the integrated expression cassette.

4. The transgenic Angelfish of claim 1, wherein the transgenic Angelfish is heterozygous for the integrated expression cassette.

5. A method of producing a transgenic Angelfish comprising:
(a) obtaining an Angelfish whose genome comprises a chromosomally integrated expression cassette encoding a red fluorescent protein, wherein the transgenic Angelfish comprise the "Red Angelfish 1 transformation event", germ stem cells comprising the "Red Angelfish 1 transformation event" having been deposited as ATCC accession no. PTA-127785; and
(b) breeding the obtained Angelfish with a second Angelfish to provide a transgenic Angelfish comprising the Red Angelfish 1 transformation event, wherein the transgenic Angelfish exhibits fluorescence.

6. The method of claim 5, wherein the second Angelfish is a non- transgenic Angelfish.

7. A progeny of a transgenic Angelfish of claim 1 that comprises a chromosomally integrated expression cassette encoding a red fluorescent protein, wherein the Angelfish and progeny exhibit fluorescence and comprise the "Red Angelfish 1 transformation event," adult germ stem cells comprising the Red Angelfish 1 transformation event having been deposited as ATCC accession no. PTA-127785.

8. The progeny fish of claim 7, further defined as a fertile, transgenic Angelfish.

9. The progeny fish of claim 7, wherein the fish is homozygous for the integrated expression cassette.

10. The progeny fish of claim 7, wherein the fish is heterozygous for the integrated expression cassette.

* * * * *